(12) United States Patent
Morishita et al.

(10) Patent No.: US 9,150,414 B2
(45) Date of Patent: Oct. 6, 2015

(54) NANOCOMPOSITE AND DISPERSION COMPRISING THE SAME

(75) Inventors: Takuya Morishita, Nagoya (JP); Kenzo Fukumori, Nisshin (JP); Mitsumasa Matsushita, Nagoya (JP); Yoshihide Katagiri, Nisshin (JP)

(73) Assignee: KABUSHIKI KAISHA TOYOTA CHUO KENKYUSHO, Aichi-Gun (JP)

( * ) Notice: Subject to any disclaimer, the term of this patent is extended or adjusted under 35 U.S.C. 154(b) by 841 days.

(21) Appl. No.: 13/215,642

(22) Filed: Aug. 23, 2011

(65) Prior Publication Data

US 2012/0053288 A1 Mar. 1, 2012

(30) Foreign Application Priority Data

Aug. 25, 2010 (JP) ................................. 2010-188097

(51) Int. Cl.
*B82Y 30/00* (2011.01)
(52) U.S. Cl.
CPC ...................................... *B82Y 30/00* (2013.01)
(58) Field of Classification Search
CPC ....................................................... B82Y 30/00
USPC ......................................... 524/543, 547, 555
See application file for complete search history.

(56) References Cited

U.S. PATENT DOCUMENTS

2006/0257339 A1\* 11/2006 Quadir ............................ 424/61
2009/0306276 A1\* 12/2009 Magnet et al. ................ 524/556

FOREIGN PATENT DOCUMENTS

| JP | A-2005-35810 | 2/2005 |
| JP | A-2010-37537 | 2/2010 |
| WO | WO 02/016257 A3 | 2/2002 |
| WO | WO 02/076888 A1 | 10/2002 |

OTHER PUBLICATIONS

Jul. 30, 2012 Notification of Reasons for Refusal issued in Japanese Patent Application No. 2010-188097 (with translation).
Moore, V.C., "individually Suspended Single-Walled Carbon Nanotubes in Various Surfactants," *Nano Letters*, 2003, pp. 1379-1382, vol. 3, No. 10.
Petrov, P. at al., "Noncovalent functionalization of multi-walled carbon nanotubes by pyrene containing polymers," *Chem. Commun.*, 2003, pp. 2904-2905.
Li, X. et al., "Multiwalled carbon nanotubes as a conducting additive in a $LiNi_{0.3}CO_{g.3}O_2$ cathode for rechargeable lithium batteries," *Carbon*, 2006, pp. 1334-1336, vol. 44.
Chen, J. et al., "Hydrothermal synthesis of lithium iron phosphate," *Electrochemistry Communications*, 2006, pp. 855-858, vol, 8.

\* cited by examiner

*Primary Examiner* — Angela C Scott
(74) *Attorney, Agent, or Firm* — Oliff PLC

(57) ABSTRACT

A nanocomposite comprises a nanostructure, and a copolymer adsorbed to the nanostructure and containing at least one ionic monomer unit and a different monomer unit from the ionic monomer unit; the ionic monomer unit selected from the group consisting of a zwitterionic monomer unit and a cationic monomer unit which are represented by the following formula (1):

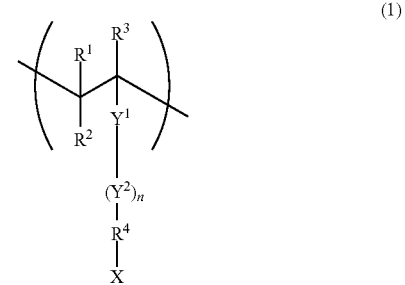

(in the formula (1), $R^1$, $R^2$, and $R^3$ each independently represent any one of a hydrogen atom and a monovalent organic group having 1 to 20 carbon atoms, $Y^1$ represents any one of a carbonyl group and an arylene group, $Y^2$ represents any one of —O— and —NH—, n is 0 or 1, $R^4$ represents a divalent organic group having 1 to 20 carbon atoms, and X represents any one of a zwitterionic group and a cationic group).

8 Claims, No Drawings

NANOCOMPOSITE AND DISPERSION COMPRISING THE SAME

BACKGROUND OF THE INVENTION

1. Field of the Invention

The present invention relates to a nanocomposite, and specifically relates to a nanocomposite comprising a nanostructure and a polymer adsorbed to the nanostructure. The present invention further relates to a dispersion comprising the nanocomposite.

2. Related Background Art

Carbon-based nanofillers represented by a carbon nanotube (CNT) are excellent in thermal conductive properties, electrical conductive properties, mechanical properties and the like. Accordingly, addition of such a nanofiller to a solvent, a resin, a metal and a ceramic has been actively examined to provide these materials with the aforementioned properties. Moreover, boron nitride-based nanofillers, represented by a boron nitride nanotube and a BCN nanotube obtained by replacing some carbon atoms in a carbon nanotube with a nitrogen atom and a boron atom, are also excellent not only in thermal conductive properties and the like, but also in electrical insulating properties unlike the carbon-based nanofillers. Hence, the boron nitride-based nanofillers attract attention as a function-providing material. However, these nanofillers are likely to aggregate by the van der Waals force, and dispersibility thereof is extremely low in a solvent and in a resin. This brings about a problem that the nanofillers can insufficiently exert the above properties.

In this aspect, various methods have been proposed to improve the dispersibility of carbon nanotubes in a solvent.

For example, International Publication No. WO2002/016267 (Literature 1) discloses a composition comprising a carbon nanotube coated at least in part with at least one polymer. The polymer is exemplified by hydrophilic polymers such as polyvinyl pyrrolidone, polystyrene sulfonate, and polyethylene glycol. Moreover, International Publication No. WO2002/076888 (Literature 2) discloses a powder in which a hydrophilic polymer is adsorbed on a carbon nanotube. The polymer is exemplified by gum arabic, carrageenan, pectin, and the like. Further, Valerie C. Moore, et al., Nano Lett., 2003, volume 3, pp. 1379-1382 (Literature 3) discloses a single-walled carbon nanotube dispersed in an aqueous medium using various surfactants. As an ionic surfactant, an anionic surfactant such as sodium dodecylbenzenesulfonate, a cationic surfactant such as cetyltrimethylammonium bromide, and the like are disclosed. By thus using the hydrophilic polymer or the ionic surfactant together with the carbon nanotube, the dispersibility of the carbon nanotube in water tends to be improved. However, even with use of such a hydrophilic polymer or ionic surfactant, it has been difficult to obtain a dispersion of a carbon nanotube having a high concentration and excellent dispersion stability.

Additionally, Petar Petrov, et al., Chem. Commun., 2003, pp. 2904-2905 (Literature 4) discloses a composite comprising a carbon nanotube and a polymer containing a pyrenyl group that can be physically adsorbed to the carbon nanotube. The polymer adsorbed to the carbon nanotube tends to improve dispersibility of the carbon nanotube in an organic solvent. Nevertheless, dispersibility of this composite in an aqueous solvent is insufficient.

Japanese Unexamined Patent Application Publication No. 2010-37537 (Literature 5) discloses a carbon nanocomposite in which a vinyl-based polymer having a pyrenyl group-containing side chain and a polyethylene glycol-side chain is adsorbed to a carbon nanostructure. It is disclosed that this carbon nanocomposite exerts excellent dispersibility not only in an organic solvent such as chloroform but also in water. However, the carbon nanocomposite does not have a sufficient dispersibility in hot water.

In addition, Xinlu Li, et al., Carbon, 2006, Volume 44, pp. 1334-1336 (Literature 6) discloses that it is effective to add a carbon-based nanofiller such as a carbon nanotube to a battery cathode material in order to improve electronic conductivity of the battery cathode material. Dispersibility of the carbon-based nanofiller in the cathode active material needs to be improved in order to exhibit excellent battery performance. However, the addition and mixing of the carbon-based nanofiller by a conventional dry method have a limitation in the improvement.

In this connection, Jiajun Chen, et al., Electrochemistry Communications, 2006, volume 8, pp. 855-858 (Literature 7) discloses a method for producing a composite where a carbon-based nanofiller is dispersed in an active material, comprising: dissolving a raw-material compound of the active material containing, for example, Li Co, Ni, Mn, Fe and P, in a dispersion comprising the carbon-based nanofiller and an aqueous solvent; and subjecting the mixture to a hydrothermal reaction at a temperature of 150 to 200° C., followed by a heat treatment (for example, 500° C. or higher) in an inert gas. However, even by use of this method, dispersibility of the carbon-based nanofiller in the active material is insufficient. Further improvement in the dispersibility of a carbon-based nanofiller in a high-temperature aqueous solvent during a hydrothermal reaction has been demanded.

SUMMARY OF THE INVENTION

The present invention has been made in view of the above-described problems of the conventional techniques, and an object of the present invention is to provide a nanocomposite excellent in dispersibility in an aqueous solvent even at high temperature, and a dispersion comprising the nanocomposite.

The present inventors have earnestly studied in order to achieve the above object. As a result, the present inventors found that, when a copolymer containing an ionic monomer unit and a different monomer unit from the ionic monomer unit, the ionic monomer unit being at least one of specific zwitterionic monomer units and specific cationic monomer units, is adsorbed to a nanostructure, a nanocomposite comprising them exhibits high dispersibility in an aqueous solvent at high temperature. This finding has led the completion of the present invention.

Specifically, the nanocomposite of the present invention comprises a nanostructure, and a copolymer adsorbed to the nanostructure and containing at least one ionic monomer unit and a different monomer unit from the ionic monomer unit, the ionic monomer unit selected from the group consisting of zwitterionic monomer units and cationic monomer units which are represented by the following formula (1):

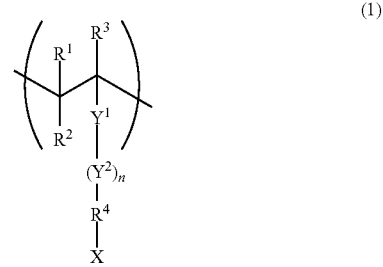

(in the formula (1), $R^1$, $R^2$, and $R^3$ each independently represent any one of a hydrogen atom and a monovalent organic group having 1 to 20 carbon atoms, $Y^1$ represents any one of a carbonyl group and an arylene group, $Y^2$ represents any one of —O— and —NH—, n is 0 or 1, $R^4$ represents a divalent organic group having 1 to 20 carbon atoms, and X represents any one of a zwitterionic group and a cationic group). Moreover, the dispersion of the present invention comprises such a nanocomposite and a solvent.

Further, a method for producing a nanocomposite of the present invention comprises mixing a nanostructure and a copolymer in a solvent to adsorb the copolymer to the nanostructure, the copolymer containing at least one ionic monomer unit and a different monomer unit from the ionic monomer unit, the ionic monomer unit selected from the group consisting of zwitterionic monomer units and cationic monomer units which are represented by the following formula (1):

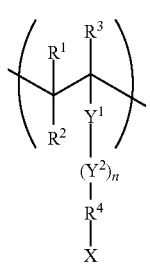

(1)

(in the formula (1), $R^1$, $R^2$, and $R^3$ each independently represent any one of a hydrogen atom and a monovalent organic group having 1 to 20 carbon atoms, $Y^1$ represents any one of a carbonyl group and an arylene group, $Y^2$ represents any one of —O— and —NH—, n is 0 or 1, $R^4$ represents a divalent organic group having 1 to 20 carbon atoms, and X represents any one of a zwitterionic group and a cationic group).

In the nanocomposite and the production method therefor of the present invention, the ionic monomer unit is preferably any one of the zwitterionic monomer unit and the cationic monomer unit. In addition, the different monomer unit preferably contains at least one selected from the group consisting of polycyclic aromatic group-containing vinyl-based monomer units, imide ring-containing vinyl-based monomer units, olefinic monomer units, a thiophene unit, a pyrrole unit, an aniline unit, an acetylene unit, arylene units, arylene ethynylene units, and arylene vinylene units, and is more preferably a polycyclic aromatic group-containing vinyl-based monomer unit.

Here, it is not exactly clear why the dispersibility of the nanocomposite in an aqueous solvent at high temperature is improved by adsorbing the copolymer according to the present invention to the nanostructure. However, the present inventors speculate as follows. Specifically, the copolymer according to the present invention contains the zwitterionic monomer unit and/or the cationic monomer unit which are represented by the formula (1). The present inventors speculate that such a zwitterionic monomer unit and a cationic monomer unit are excellent in affinity for an aqueous solvent at high temperature in comparison with a nonionic monomer unit and an anionic monomer unit. The present inventors speculate that, as a result thereof, it is possible to suppress aggregation of the nanocomposites in the aqueous solvent at high temperature, and the excellent dispersibility of the nanocomposite can be retained even in the aqueous solvent at high temperature. Meanwhile, for example, a nonionic monomer unit generally exhibits affinity for an aqueous solvent by a hydrogen bond. The present inventors speculate that this hydrogen bond is, however, dissociated at high temperature (for example, 150° C. or higher), the affinity for an aqueous solvent is lowered, and the nanocomposites aggregate together.

Moreover, the copolymer according to the present invention contains the different monomer unit from the ionic monomer unit. The present inventors speculate that, in the nanocomposite of the present invention, since the different monomer unit is adsorbed to a surface of the nanostructure, the adsorption capability of the copolymer to the nanostructure is improved. The present inventors speculate that, as a result thereof, the copolymer according to the present invention has improved adsorption capability to the nanostructure at high temperature in comparison with a homopolymer not containing such a different monomer, thereby suppressing aggregation of the nanocomposites.

According to the present invention, it is possible to obtain a nanocomposite excellent in dispersibility in an aqueous solvent even at high temperature, and a dispersion comprising the nanocomposite.

DETAILED DESCRIPTION OF THE PREFERRED EMBODIMENTS

Hereinafter, the present invention will be described in details on the basis of preferred embodiments thereof.

A nanocomposite of the present invention comprises a nanostructure, and a copolymer adsorbed to the nanostructure and containing at least one ionic monomer unit and a different monomer unit from the ionic monomer unit, the ionic monomer unit selected from the group consisting of specific zwitterionic monomer units and specific cationic monomer units.

(Nanostructure)

The nanostructure used in the present invention is not particularly limited. Examples thereof include nanofillers including: carbon-based nanofillers such as carbon nanofiber, carbon nanohorn, carbon nanocorn, carbon nanotube, carbon nanocoil, carbon microcoil, carbon nanowall, carbon nanochaplet, fullerene, graphite, graphene, graphene nanoribbon, nanographene, nanographite, carbon black, and carbon nanoflake; and boron nitride-based nanofillers such as a boron nitride (BN) nanotube and a BCN nanotube obtained by replacing some carbon atoms in a carbon nanotube with a nitrogen atom and a boron atom. These nanostructures may be used alone or in combination of two or more kinds.

Among these nanostructures, from the viewpoint of improvement in thermal conductive properties of a dispersion to be obtained, preferred are anisotropic nanofillers including: anisotropic carbon-based nanofillers such as carbon nanofiber, carbon nanohorn, carbon nanocorn, carbon nanotube, carbon nanocoil, carbon microcoil, carbon nanowall, carbon nanochaplet, graphite, and graphene; and anisotropic boron nitride-based nanofillers such as a BCN nanotube and a BN nanotube. From the viewpoint of further improvement in thermal conductive properties and electrical conductive properties, the anisotropic carbon-based nanofillers are more preferable; carbon nanofiber, carbon nanohorn, carbon nanocorn, carbon nanotube, carbon nanocoil, carbon nanowall, and carbon nanochaplet are further preferable; and carbon nanofiber, carbon nanohorn, carbon nanotube, and carbon nanocoil are particularly preferable.

An average diameter of such a nanostructure is not particularly limited, but is preferably 1000 nm or less, more preferably 500 nm or less, further preferably 300 nm or less, particularly preferably 200 nm or less, and most preferably 100 nm or less. If the average diameter of the nanostructure exceeds the upper limit, there are tendencies that the thermal conductive properties and the electrical conductive properties of the dispersion of the present invention are insufficiently exhibited, and that, in a case where the nanocomposite is added to a resin for use as a resin composite material, mechanical strengths such as tensile strength and impact strength and the thermal conductive properties are insufficiently exhibited by addition of small amount thereof. Meanwhile, a lower limit of the average diameter of the nanostructure is not particularly limited, but is preferably 0.4 nm or more, and more preferably 0.5 nm or more.

In a case where the nanostructure is the anisotropic nanofiller, an aspect ratio thereof is not particularly limited, but is preferably 3 or more, more preferably 5 or more, further preferably 10 or more, particularly preferably 40 or more, and most preferably 80 or more, from the viewpoint of improvement in the thermal conductive properties and the electrical conductive properties of the dispersion of the present invention, as well as from the viewpoint that in a case where the nanocomposite is added to a resin for use as a resin composite material, addition of small amount thereof improves the thermal conductive properties and mechanical strengths such as tensile strength and impact strength.

The nanostructure used in the present invention may have a shape like a single trunk or a dendritic shape in which many pieces of the nanostructure have outwardly grown like a branch. From the viewpoint that the thermal conductive properties, the mechanical strengths, and the like are improved in a case where the nanocomposite is added to a resin for use as a resin composite material, the shape is preferably like a single trunk. In addition, the followings can be also used as the nanostructure: a nanostructure having a structure into which a substituent such as a carboxyl group, a nitro group, an amino group, an alkyl group, and an organic silyl group, a polymer such as poly(meth)acrylic acid ester, an electroconductive polymer such as polyaniline, polypyrrole, polyacetylene, poly(para-phenylene), polythiophene and polyphenylene vinylene, or the like is introduced through a chemical bond; and a nanostructure coated with another nanostructure.

In the present invention, in a case where the carbon-based nanofiller is used as the nanostructure, the carbon-based nanofiller may contain an atom other than carbon or may contain a molecule. The carbon-based nanofiller may encapsulate metals or other nanostructures, if necessary. Further, in the present invention, in a case where the carbon nanotube or the carbon nanofiber is used as the nanostructure, any of single-walled ones and multi-walled (double-walled or more) ones can be used. In accordance with the application, any of these carbon nanotubes and carbon nanofibers can be suitably selected for use, or can be used in combination.

In the present invention, in a case where the carbon-based nanofiller is used as the nanostructure, a ratio (G/D) of a G band to a D band is not particularly limited. Here, among peaks in a raman spectrum obtained by measuring the carbon-based nanofiller by using a raman spectrometry, the G band is observed at around 1585 cm$^{-1}$ and attributed to tangential vibration of carbon atoms in a graphene structure, and the D band is observed at around 1350 cm$^{-1}$ in a case where a defect such as a dangling bond is present in the graphene structure. In applications where high thermal conductive properties are required, however, the ratio (G/D) is preferably 0.1 or more, more preferably 1.0 or more, further preferably 3.0 or more, particularly preferably 5.0 or more, and most preferably 10.0 or more. If the G/D is less than the lower limit, the thermal conductive properties tend to be insufficiently provided.

A method for producing such a nanostructure is not particularly limited. For example, a carbon-based nanofiller can be produced by appropriately selecting a production method from conventionally-known production methods including chemical vapor deposition methods (CVD methods) such as a laser ablation method, an arc synthesis method and a HiPco process; a direct injection pyrolytic synthesis method (DIPS method); a melt-spinning method; and the like; in accordance with the application. However, the nanostructure is not limited to those produced in accordance with these methods.

(Copolymer)

The copolymer used in the present invention contains at least one ionic monomer unit and a different monomer unit from such an ionic monomer unit, the ionic monomer unit selected from the group consisting of zwitterionic monomer units and cationic monomer units which are represented by the following formula (1):

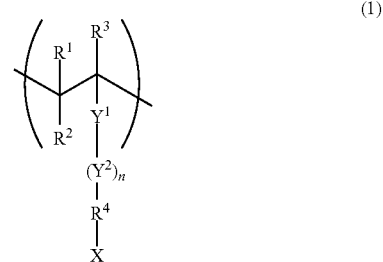

(1)

(in the formula (1), $R^1$, $R^2$, and $R^3$ each independently represent any one of a hydrogen atom and a monovalent organic group having 1 to 20 carbon atoms, $Y^1$ represents any one of a carbonyl group and an arylene group, $Y^2$ represents any one of —O— and —NH—, n is 0 or 1, $R^4$ represents a divalent organic group having 1 to 20 carbon atoms, and X represents any one of a zwitterionic group and a cationic group). The copolymer containing such a zwitterionic monomer unit and/or a cationic monomer unit is excellent in affinity for an aqueous solvent at high temperature in comparison with a nonionic monomer unit and/or an anionic monomer unit. Thus, it is possible to suppress aggregation of the nanocomposites, and the excellent dispersibility of the nanocomposite can be retained even in the aqueous solvent at high temperature.

In the formula (1), $R^1$, $R^2$, and $R^3$ each independently represent any one of a hydrogen atom and a monovalent organic group having 1 to 20 carbon atoms. The number of the carbon atoms of the monovalent organic group is preferably 1 to 10, and more preferably 1 to 5. Examples of such a monovalent organic group include an alkyl group, an alkyl ester group, a carboxyl group, and the like.

Among these, as $R^1$ and $R^2$, a hydrogen atom, an alkyl ester group, and a carboxyl group are preferable, and a hydrogen atom is particularly preferable. Meanwhile, as $R^3$, a hydrogen atom, a methyl group, an alkyl ester group, and a carboxyl group are preferable, and a hydrogen atom and a methyl group are particularly preferable.

In the formula (1), $Y^1$ represents any one of a carbonyl group and an arylene group. The arylene group is not particularly limited, but preferred are a phenylene group and a substituted phenylene group where at least one hydrogen atom of a phenylene group is substituted with a different atom or a substituent. Among these, from the viewpoint of improvement in the dispersibility of the nanocomposite in an aqueous solvent at high temperature, a carbonyl group is preferable.

Moreover, in the formula (1), $Y^2$ represents any one of —O— and —NH—. Although n is 0 or 1, 1 is preferable from the viewpoint of improvement in the dispersibility of the nanocomposite in an aqueous solvent at high temperature. $R^4$ represents a divalent organic group having 1 to 20 carbon atoms, preferably 1 to 10 carbon atoms, and more preferably 1 to 6 carbon atoms. As such a divalent organic group, preferred are a methylene group, an ethylene group, a propylene group, a butylene group, a pentamethylene group, a hexamethylene group, and substituted products thereof where at least one hydrogen atom of these groups is substituted with a different atom or a substituent.

In the formula (1), X represents any one of the zwitterionic group and the cationic group. Accordingly, in the present invention, an ionic monomer unit having the zwitterionic group at X in the formula (1) is referred to as a "zwitterionic monomer unit", while an ionic monomer unit having the cationic group at X is referred to as a "cationic monomer unit". Among such ionic monomer units, from the viewpoint of improvement in the dispersibility of the nanocomposite in an aqueous solvent at high temperature, the cationic monomer unit is preferable.

The zwitterionic group is not particularly limited, but from the viewpoint of improvement in the dispersibility of the nanocomposite, particularly, the dispersibility of the nanocomposite in an aqueous solvent at high temperature, a sulfobetaine group containing a sulfonate group and an ammonium group (for example, a trimethylammonium group), a carboxybetaine group containing a carboxyl group and an ammonium group, and a phosphorylcholine group are preferable, and a phosphorylcholine group is more preferable. Note that the phosphorylcholine group has the same structure as a polar region of the phospholipid structure of a cell membrane, and is accordingly a zwitterionic group excellent in bioaffinity. The phosphorylcholine group is a preferable zwitterionic group in terms of providing high bioaffinity to the nanostructure, and suppressing adsorption of a protein to the nanostructure.

In addition, the cationic group is not particularly limited. Examples of a cation for forming the cationic group include tertiary and quaternary ammonium ions, and examples of a counter anion thereof include halide ions such as an chloride ion, a bromide ion, and an iodide ion, a sulfate ion (in a case where the cation is a quaternary ammonium ion or a tertiary amine, the number of moles is ½), and the like. Among them, from the viewpoints of the dispersibility of the nanocomposite and a raw-material cost, it is preferable that the cation be the quaternary ammonium ion, and that the counter anion thereof is a chloride ion, a bromide ion, an iodide ion, or a sulfate ion.

The zwitterionic monomer unit and the cationic monomer unit according to the present invention are generally monomer units derived from a zwitterionic monomer and a cationic monomer which are represented by the following formula (2):

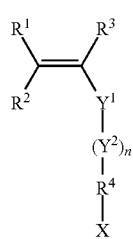

(2)

(in the formula (2), $R^1$, $R^2$, $R^3$, $Y^1$, $Y^2$, n, $R^4$, and X are the same as $R^1$, $R^2$, $R^3$, $Y^1$, $Y^2$, n, $R^4$, and X in the formula (1)). However, the monomer units are not limited to ones derived from the zwitterionic monomer, as long as the monomer units are represented by the formula (1).

The zwitterionic monomer is not particularly limited. As the zwitterionic monomer containing a phosphorylcholine group, preferred is 2-((meth)acryloyloxy)ethyl-2'-(trimethylammonio)ethyl phosphate [2-(meth)acryloyloxyethyl phosphorylcholine].

As the zwitterionic monomer containing a sulfobetaine group, preferred are 3-(meth)acryloylaminopropyldimethyl (3-sulfopropyl)ammonium hydroxide and N-(3-sulfopropyl)-N-((meth)acryloyloxyethyl)-N,N-dimethylammonium betaine. As the zwitterionic monomer containing a carboxybetaine group, preferred are N,N-dimethyl-N-(2-carboxyethyl)-2'-(meth)acryloyloxyethylammonium betaine and 2-carboxy-N,N-dimethyl-N-(2'-(meth)acryloyloxyethyl) ethane ammonium salt (CMBA).

The cationic monomer is not particularly limited. Examples thereof include quaternary ammonium salts such as 2-((meth)acryloyloxy)ethyltrimethylammonium chloride [(meth)acryloylcholine chloride], 2-((meth)acryloyloxy) ethyltrimethylammonium bromide [(meth)acryloylcholine bromide], 2-((meth)acryloyloxy)ethyltrimethylammonium iodide, 2-((meth)acryloyloxy)ethyltrimethylammonium sulfate, (2-(meth)acrylamidoethyl) trimethylammonium chloride, (3-(meth) acrylamidopropyl)trimethylammonium chloride, (2-(meth)acrylamidoethyl)trimethylammonium bromide, and (3-(meth)acrylamidopropyl)trimethylammonium bromide;

quaternized salts obtained from a tertiary amine with a halogenated hydrocarbon, such as a methyl chloride salt of 2-((meth)acryloyloxy) ethyldimethylamine, a methyl bromide salt of 2-((meth)acryloyloxy) ethyldimethylamine, and a benzyl chloride salt of 2-((meth)acryloyloxy) ethyldimethylamine; and tertiary ammonium salts such as 2-((meth)acryloyloxy)ethyldimethylamine sulfate and 2-((meth)acryloyloxy) ethyldimethylamine hydrochloride.

The different monomer unit according to the present invention is not particularly limited, as long as the different monomer unit is a monomer unit other than those exemplified as the ionic monomer unit. However, from the viewpoint of improvement in the dispersibility of the nanocomposite in an aqueous solvent at high temperature, preferred are a polycyclic aromatic group-containing vinyl-based monomer unit, an imide ring-containing vinyl-based monomer unit, an olefinic monomer unit, a thiophene unit, a pyrrole unit, an aniline unit, an acetylene unit, an arylene unit, an arylene ethynylene unit, and an arylene vinylene unit. From the viewpoints of improvement in the adsorption capability to the nanostructure and further improvement in the dispersibility of the nanocomposite in an aqueous solvent at high temperature, a polycyclic aromatic group-containing vinyl-based monomer unit and an imide ring-containing vinyl-based monomer unit are more preferable. In the copolymer used in the present invention, these monomer units may be contained alone or in combination of two or more kinds.

The polycyclic aromatic group-containing vinyl-based monomer unit is not particularly limited. Examples thereof include one in which a polycyclic aromatic group is bonded to an aromatic vinyl-based monomer unit directly or through a divalent organic group, one in which a polycyclic aromatic group is bonded to an amide group-containing vinyl-based monomer unit directly or through a divalent organic group, and the like. Preferred is one represented by the following formula (3):

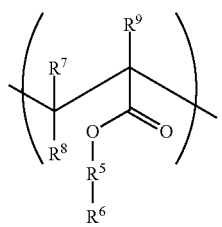

(3)

In the formula (3), $R^5$ represents a divalent organic group having 1 to 20 carbon atoms, $R^6$ represents a monovalent polycyclic aromatic-containing group, and $R^7$, $R^8$, and $R^9$ each independently represent any one of a hydrogen atom and a monovalent organic group having 1 to 20 carbon atoms.

As $R^5$, a divalent organic group having 1 to 20 carbon atoms is preferable, and methylene, ethylene, propylene, butylene, pentamethylene, hexamethylene, and a substituted product thereof where one or more hydrogen atoms have been substituted with a different atom are more preferable. Butylene is particularly preferable, from the viewpoints of the adsorption capability and the adsorption stability to the nanostructure and from the viewpoint of polymerization reactivity during copolymerization with the ionic monomer. As $R^6$, naphthyl, naphthalenyl, anthracenyl, pyrenyl, terphenyl, perylene, phenanthrenyl, tetracene, pentacene, and a substituted product thereof where one or more hydrogen atoms have been substituted with a different atom are preferable. From the viewpoints of the adsorption capability and the adsorption stability to the nanostructure, pyrenyl is particularly preferable. As $R^7$ and $R^8$, a hydrogen atom, an alkyl ester group, and a carboxyl group are preferable, and a hydrogen atom is particularly preferable. As $R^9$, a hydrogen atom, a methyl group, an alkyl ester group, and a carboxyl group are preferable, and a hydrogen atom and a methyl group are particularly preferable. In the copolymer used in the present invention, such polycyclic aromatic group-containing vinyl-based monomer units may be contained alone or in combination of two or more kinds.

Examples of the imide ring-containing vinyl-based monomer unit include a maleimide-based monomer unit represented by the following formula (4):

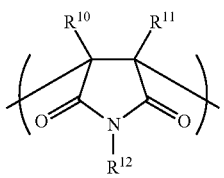

(4)

(in the formula (4), $R^{10}$ and $R^{11}$ each independently represent any one of a hydrogen atom and an alkyl group, and $R^{12}$ represents any one of a hydrogen atom and a monovalent organic group such as an alkyl group, an alkynyl group, an aralyl group, a cycloalkyl group, an aryl group, and an amino group); a glutarimide group-containing constitutional unit represented by the following formula (5):

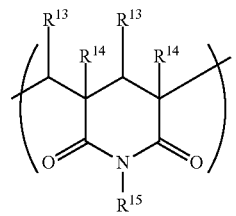

(5)

(in the formula (5), $R^{13}$ and $R^{14}$ each independently represent any one of a hydrogen atom and an alkyl group, $R^{15}$ represents any one of a hydrogen atom and a monovalent organic group such as an alkyl group, an alkynyl group, an aralyl group, a cycloalkyl group, an aryl group, and an amino group); an N-alkenyl imide unit and derivative units thereof; and the like.

The maleimide-based monomer used for forming such an imide group-containing constitutional unit is not particularly limited. Examples thereof include maleimide;

N-alkylmaleimides such as N-methylmaleimide, N-ethylmaleimide, N-n-propylmaleimide, N-isopropylmaleimide, N-n-butylmaleimide, N-isobutylmaleimide, N-tert-butylmaleimide, N-n-pentylmaleimide, N-n-hexylmaleimide, N-n-heptylmaleimide, N-n-octylmaleimide, and N-n-dodecylmaleimide;

N-alkynylmaleimides such as N-acetylenylmaleimide and N-propynylmaleimide;

N-aralkylmaleimides such as N-benzylmaleimide, N-methylbenzylmaleimide, N-phenylethylmaleimide, N-naphthylmethylmaleimide, and N-naphthylethylmaleimide;

N-cycloalkylmaleimides such as N-unsubstituted cycloalkylmaleimides represented by N-cyclohexylmaleimide and N-substituted cycloalkylmaleimides represented by N-methylcyclohexylmaleimide;

N-arylmaleimides such as N-unsubstituted arylmaleimides represented by N-phenylmaleimide, N-naphthylmaleimide, N-naphthalenylmaleimide, N-perylenylmaleimide, N-pentacenylmaleimide, N-terphenylmaleimide, N-phenanthrenylmaleimide, N-tetracenylmaleimide, N-anthracenylmaleimide, and N-pyrenylmaleimide, N-alkyl-substituted arylmaleimides represented by N-tolylmaleimide and N-xylylmaleimide, N-amino-substituted arylmaleimides represented by N-(4-aminophenyl)maleimide, N-alkynyl-substituted arylmaleimides represented by N-acetylenylphenylmaleimide and N-propynylphenylmaleimide, N-aryl-substituted arylmaleimides represented by N-biphenylmaleimide, and N-halogen-substituted arylmaleimides represented by N-o-chlorophenylmaleimide, N-(2,4,6-trichlorophenyl) maleimide, N-pentafluorophenylmaleimide, and N-tetrafluorophenylmaleimide;

heterocyclic ring-substituted maleimides such as N-pyridylmaleimide, N-3-(9-alkylcarbazoyl)maleimide, and N-(9-acridinyl)maleimide;

bismaleimides such as N,N'-1,4-phenylenedimaleimide, N,N'-1,3-phenylenedimaleimide, and 4,4'-bismaleimidodiphenylmethane;

halogenated maleimides such as N-fluoromaleimide, N-chloromaleimide, N-bromomaleimide, and N-iodomaleimide;

N-aminomaleimide, N-acetylmaleimide, N-hydroxymaleimide, N-hydroxyphenylmaleimide, p-carboxyphenylmaleimide, N-(2-carboxyethyl)maleimide, N-hydroxysuccinimidyl 3-maleimidopropionate, N-hydroxysuccinimidyl 6-maleimidohexnoate, 3-[2-(2-maleimidoethoxy)ethylcarbamoyl]-2,2,5,5-tetramethyl-1-pyrrolidinyloxy, N-hydroxysuccinimidyl 3-maleimidobenzoate, and the like.

These maleimide-based monomers may be used alone or in combination of two or more kinds. In addition, these maleimide-based monomers may have a water soluble substituent, such as a sulfone group or a sulfonimide group, if necessary. Further, salts of these maleimide-based monomers can be each used.

The glutarimide used for forming the imide group-containing constitutional unit is not particularly limited. Example thereof include glutarimide;

N-alkylglutarimides such as N-methylglutarimide, N-ethylglutarimide, N-n-propylglutarimide, N-isopropylglutarimide, N-n-butylglutarimide, N-isobutylglutarimide, N-tert-butylglutarimide, N-n-pentylglutarimide, N-n-hexylglutarimide, N-n-heptylglutarimide, N-n-octylglutarimide, and N-n-dodecylglutarimide;

N-alkynylglutarimides such as N-acetylenylglutarimide and N-propynylglutarimide;

N-aralkylglutarimides such as N-benzylglutarimide and N-methylbenzylglutarimide;

N-cycloalkylglutarimides such as N-unsubstituted cycloalkylglutarimides represented by N-cyclohexylglutarimide and N-substituted cycloalkylglutarimides represented by N-methylcyclohexylglutarimide;

N-arylglutarimides such as N-unsubstituted arylglutarimides represented by N-phenylglutarimide, N-naphthylglutarimide, N-anthracenylglutarimide, and N-pyrenylglutarimide, alkyl-substituted arylglutarimides represented by N-tolylglutarimide and N-xylylglutarimide, N-amino-substituted arylglutarimides represented by N-(4-aminophenyl)glutarimide, N-alkynyl-substituted arylglutarimides represented by N-acetylenylphenylglutarimide and N-propynylphenylglutarimide, and N-aryl-substituted arylglutarimides represented by N-biphenylglutarimide; and the like. These glutarimide may be used alone or in combination of two or more kinds.

Further, the N-alkenyl imide or a derivative thereof used for forming the imide group-containing constitutional unit is not particularly limited. Examples thereof include N-vinylsuccinimide, N-vinylphthalimide, 1-vinylimidazole, N-vinylcarbazole, and the like. These may be used alone or in combination of two or more kinds.

In the copolymer used in the present invention, such imide group-containing constitutional units may be contained alone or in combination of two or more kinds. Among these imide group-containing constitutional units, from the viewpoint of improvement in the dispersibility and heat resistance of the nanocomposite, the maleimide-based monomer unit is preferable; at least one of the maleimide monomer unit, the N-cycloalkylmaleimide monomer unit, the N-arylmaleimide monomer unit, and the N-alkylmaleimide monomer unit is more preferable; and the N-arylmaleimide monomer unit is particularly preferable. In a case where the copolymer contains the rigid imide group-containing constitutional unit as the different vinyl-based monomer unit, the rigidity tends to be further enhanced by increasing a content of the imide group-containing constitutional unit. Thereby, even when the nanocomposite has, for example, an average diameter of 30 nm or less, there is a tendency that the dispersibility can be improved more sufficiently.

Examples of the olefinic monomer unit include a monoolefinic monomer unit, a dienic monomer unit, and the like. In the copolymer used in the present invention, these olefinic monomer units may be contained alone or in combination of two or more kinds. Examples of the olefinic monomer used for forming such a monomer unit include monoolefinic monomers such as ethylene, propylene, 1-butene, cis-2-butene, trans-2-butene, isobutene, 1-pentene, 2-pentene, 2-methyl-1-butene, 3-methyl-1-butene, 2,3-dimethyl-2-butene, 1-butene, 1-hexene, 1-octene, 1-nonene, and 1-decene; dienic monomers such as allene, methylallene, butadiene, 2,3-dimethylbutadiene, 1,3-pentadiene, 1,4-pentadiene, chloroprene, and 1,5-hexadiene; and the like.

The thiophene unit is not particularly limited. Examples thereof include an alkylthiophene unit, an alkoxythiophene unit, an alkoxyalkylthiophene unit, and the like. Among them, an alkylthiophene unit and an alkoxythiophene unit are preferable. In the copolymer used in the present invention, these thiophene units may be contained alone or in combination of two or more kinds. In addition, as the copolymer used in the present invention, one having such a thiophene unit introduced as a polythiophene block unit is preferred to one having the thiophene unit introduced at random. There is a tendency that the dispersibility of the nanocomposite in an aqueous solvent at high temperature is improved by introduction of the polythiophene block unit. Such a block copolymer can be synthesized by, first, synthesizing a polythiophene having, at a terminal, a functional group capable of vinyl-polymerization such as living radical polymerization or radical polymerization, and then by polymerizing at least one ionic monomer to the terminal of the polythiophene, the ionic monomer unit selected from the zwitterionic monomers and the cationic monomers which are represented by the formula (2). Examples of the polythiophene include a poly-3-alkylthiophene, a poly-3-alkoxythiophene, a poly-3-alkoxy-4-alkylthiophene, and the like. The number of carbon atoms in the alkyl group and/or the alkoxy group of such a polythiophene is not particularly limited, but is preferably 1 to 20, and more preferably 1 to 12. The alkyl group and the alkoxy group may be any of a linear one and a branched one Examples of such a poly-3-alkylthiophene include poly-3-methylthiophene, poly-3-ethylthiophene, poly-3-propylthiophene, poly-3-butylthiophene, poly-3-hexylthiophene, poly-3-octylthiophene, poly-3-decylthiophene, poly-3-dodecylthiophene, poly-3-octadecylthiophene, and the like. Moreover, examples of the poly-3-alkoxythiophene include poly-3-methoxythiophene, poly-3-ethoxythiophene, poly-3-dodecyloxythiophene, and the like. Further, examples of the poly-3-alkoxy-4-alkylthiophene include poly-3-methoxy-4-methylthiophene, poly-3-methoxy-4-hexylthiophene, poly-3-dodecyloxy-4-hexylthiophene, poly-3-dodecyloxy-4-methylthiophene, and the like.

The arylene ethynylene unit is not particularly limited, but examples thereof include a polyphenylene ethynylene unit, and the like. Furthermore, the arylene vinylene unit is not particularly limited, but examples thereof include a polyphenylene vinylene unit, a polythienylene vinylene unit, and the like.

Additionally, the copolymer used in the present invention may further contain another monomer unit than the above-described preferable different monomer unit, if necessary. Examples of such a monomer unit include an unsaturated carboxylic acid ester monomer unit, a vinyl-cyanide-based monomer unit, an unsaturated carboxylic acid monomer unit, acid anhydride units thereof and derivative units thereof, an epoxy group-containing vinyl-based monomer unit, an oxazoline group-containing vinyl-based monomer unit, an amino group-containing vinyl-based monomer unit, an amide group-containing vinyl-based monomer unit, a hydroxyl group-containing vinyl-based monomer unit, a vinyl halide-based monomer unit, a carboxylic acid unsaturated ester monomer unit, a different cationic monomer unit from the cationic monomer unit represented by the formula (1), an anionic monomer unit, a polyoxyalkylene group-containing vinyl-based monomer unit, a silyl group-containing vinyl-based monomer unit, a polysiloxane group-containing vinyl-based monomer unit, and the like. These monomer units may be contained alone or in combination of two or more kinds.

In such a copolymer, a content percentage of the ionic monomer unit represented by the formula (1) is not particularly limited, but is preferably 0.1% by mole or more, more preferably 0.5% by mole or more, further preferably 1% by mole or more, particularly preferably 2% by mole or more, and most preferably 5% by mole or more. If the content percentage of the ionic monomer unit is less than the lower limit, the dispersibility of the nanocomposite in an aqueous solvent at high temperature tends to be deteriorated. Meanwhile, an upper limit of the content percentage of the ionic monomer unit is not particularly limited, but preferably 99.9% by mole or less, more preferably 99.5% by mole or less, further preferably 99% by mole or less, and particularly preferably 95% by mole or less. Note that the proportion of the ionic monomer unit represented by the formula (1) in the copolymer can be determined from the ratio of the integration value of proton of unit, the integration value being determined by a $^1$H-NMR measurement in heavy water under conditions of 30° C. and 400 MHz.

In the present invention, a number average molecular weight of the copolymer is not particularly limited, but is preferably $0.1 \times 10^4$ or more. From the viewpoint of increase in an amount of the copolymer adsorbed to the nanostructure, the number average molecular weight is more preferably $0.2 \times 10^4$ or more, and particularly preferably $0.3 \times 10^4$ or more. Meanwhile, an upper limit of the number average molecular weight of such a copolymer is not particularly limited, but is preferably $500 \times 10^4$ or less, more preferably $100 \times 10^4$ or less, and particularly preferably $50 \times 10^4$ or less. If the number average molecular weight of the copolymer exceeds the upper limit, flowability of the copolymer tends to be deteriorated, and the dispersibility of the nanocomposite tends to be deteriorated. Furthermore, a molecular weight distribution (weight average molecular weight/number average molecular weight) of the copolymer is not particularly limited, but may be unimodal distribution or multi-modal distribution.

Such a copolymer can be produced by copolymerizing at least one ionic monomer with the different monomer from the ionic monomer, the ionic monomer unit selected from the zwitterionic monomers and the cationic monomers which are represented by the formula (2). The transferring medium of the reaction chain in such a copolymerization reaction is not particularly limited, but examples thereof include a radical and an ion. As such a copolymerization reaction, radical polymerization or living radical polymerization is preferable, and, from the industrial viewpoint, radical polymerization is particularly preferable.

The polymerization methods in the radical polymerization and ionic polymerization are not particularly limited. For example, conventional polymerization methods such as bulk polymerization, solution polymerization, suspension polymerization, emulsion polymerization, and precipitation polymerization can be employed singly or in combination of two or more. The polymerization method may be either batch type or continuous type. The target copolymer can be also synthesized by synthesizing a precursor of the copolymer in advance, and then allowing the precursor to appropriately react with each other or with another monomer. Note that a conventionally-known polymerization initiator, a chain transfer agent, a catalyst, a dispersion stabilizer, a solvent, and the like can be used in the method for producing such a copolymer.

The sequence in the copolymer according to the present invention is not particularly limited, but may be any of, for example, dendric such as random, block, alternating, graft, and hyper branch, and branched as in a star polymer and the like. From the viewpoint of improvement in the dispersibility of the nanocomposite in an aqueous solvent at high temperature, at least one of random, block, alternating, and graft is preferable.

(Properties of nanocomposite)

In the nanocomposite of the present invention, the copolymer is adsorbed to the nanostructure. Conventionally, the nanostructure has been difficult to disperse in a solvent and in a resin. Nevertheless, by adsorbing the copolymer to the nanostructure, the nanostructure can be uniformly dispersed in a resin and in a solvent, particularly in an aqueous solvent even at high temperature.

In the nanocomposite of the present invention, an amount of the copolymer adsorbed to the nanostructure is not particularly limited. However, from the viewpoint of improvement in the dispersibility of the nanocomposite in an aqueous solvent at high temperature, the amount is preferably 0.1 parts by mass or more, more preferably 0.5 parts by mass or more, further preferably 1.0 parts by mass or more, particularly preferably 2.0 parts by mass or more, and most preferably 3.0 parts by mass or more, relative to 100 parts by mass of the nanostructure. If the amount of the copolymer adsorbed is less than the lower limit, the dispersibility of the nanocomposite tends to be deteriorated. On the other hand, an upper limit of the amount of the copolymer adsorbed is, from the viewpoint of improvement in the dispersibility of the nanocomposite in an aqueous solvent at high temperature, preferably 200 parts by mass or less, and more preferably 150 parts by mass or less, relative to 100 parts by mass of the nanostructure.

The nanocomposite of the present invention can be added into a resin, a metal, and a ceramic for use. In a case where the nanocomposite is added to a resin to prepare a resin composition, an amount of the nanocomposite added is not particularly limited, but is preferably 0.1% by volume or more, more preferably 0.3% by volume or more, further preferably 0.5% by volume or more, particularly preferably 0.7% by volume or more, and most preferably 1.0% by volume or more, relative to the whole resin composition (100% by volume). Meanwhile, an upper limit of the amount of the nanocomposite added is not particularly limited, as long as the insulating properties can be retained. From the viewpoint of moldability, the upper limit is preferably 50% by volume or less, more preferably 25% by volume or less, further preferably 20% by volume or less, particularly preferably 10% by volume or less, and most preferably 5% by volume or less.

<Method for Producing Nanocomposite>

A method for producing the nanocomposite of the present invention is not particularly limited, as long as the method allows adsorption of the copolymer to the nanostructure. Examples thereof include the following methods:

(i) a method in which the nanostructure and the copolymer are mixed in a solvent, (ii) a method in which the nanostructure and the copolymer are mixed without a solvent, (iii) a method in which the nanostructure and the melted copolymer are mixed, (iv) a method in which the nanostructure and the copolymer are mixed without a solvent and then the copolymer is melted, and (v) a method in which the copolymer is synthesized by polymerization in the presence of the nanostructure, if necessary, using a solvent.

Such methods for producing the nanocomposite of the present invention may be carried out singly or in combination of two or more. Moreover, in these production methods, at least one of treatments such as ultrasonic wave treatment, vibration, stirring, application of external field (for example, magnetic field application, electric field application, and the like), and melt-kneading is preferably performed during the mixing or after the polymerization. Among them, ultrasonic wave treatment is more preferably performed. The ultrasonic wave treatment is not particularly limited, but examples thereof include a method using an ultrasonic cleaner and a method using an ultrasonic homogenizer. Note that when the melt-kneading treatment is performed, the nanostructure, the copolymer, and, if necessary, a resin and/or an additive, all of which are in any form of a pellet form, a powder form and a small piece form, may be uniformly mixed, for example, with a stirrer or a dry blender or by hand, followed by melt-kneading by using a single-screw or multiple-screw extruder having a vent, a rubber roller, a Banbury mixer, or the like.

Among such methods for producing the nanocomposite of the present invention, a preferable method to obtain the nanocomposite of the present invention is the production method (i), that is, a method in which the nanostructure and the copolymer are mixed in a solvent to adsorb the copolymer to the nanostructure, from the viewpoint of increase in the amount of the copolymer adsorbed to the nanostructure. More preferably, ultrasonic wave treatment is performed when the mixing is carried out in employing this production method.

The method of mixing the nanostructure and the copolymer is not particularly limited, but the mixing may be performed at once or sequentially. Further, as for the order thereof, the copolymer may be added to the nanostructure, the nanostructure may be added to the copolymer, or the nanostructure and the copolymer may be added together simultaneously or alternately. In addition, when the nanostructure and the copolymer are mixed, another resin or additive may be added. The resin and additive may be mixed at once or sequentially. The order thereof is not particularly limited.

The mixing ratio between the nanostructure and the copolymer is not particularly limited, but an amount of the copolymer added is preferably 0.1 parts by mass or more, more preferably 0.5 parts by mass or more, further preferably 1.0 parts by mass or more, particularly preferably 2.0 parts by mass or more, and most preferably 3.0 parts by mass or more, relative to 100 parts by mass of the nanostructure. If the amount of the copolymer added is less than the lower limit, the dispersibility and the heat resistance of the nanocomposite tend to be deteriorated. Meanwhile, an upper limit of the amount of the copolymer added is preferably 100000 parts by mass or less relative to 100 parts by mass of the nanostructure. From the viewpoint of improvement in the thermal conductive properties in applications where the thermal conductive properties of a resin composition comprising a nanocomposite are required, the upper limit is more preferably 1000 parts by mass or less, and further preferably 500 parts by mass or less.

The solvent used in the production method (i) or (v) is not particularly limited. Examples thereof include water, chloroform, dichloromethane, carbon tetrachloride, acetone, methyl ethyl ketone, methyl isobutyl ketone, diisobutyl ketone, methyl acetate, ethyl acetate, propyl acetate, isopropyl acetate, butyl acetate, isobutyl acetate, pentyl acetate, isopentyl acetate, amyl acetate, tetrahydrofuran, N-methyl-2-pyrrolidone, dimethylformamide, dimethylacetamide, dimethyl sulfoxide, acetonitrile, methanol, ethanol, propanol, isopropanol, butanol, hexanol, octanol, hexafluoroisopropanol, ethylene glycol, propylene glycol, tetramethylene glycol, tetraethylene glycol, hexamethylene glycol, diethylene glycol, benzene, toluene, xylene, chlorobenzene, dichlorobenzene, trichlorobenzene, chlorophenol, phenol, sulfolane, 1,3-dimethyl-2-imidazolidinone, γ-butyrolactone, N-dimethylpyrrolidone, pentane, hexane, neopentane, cyclohexane, heptane, octane, isooctane, nonane, decane, diethyl ether, and the like. Among these solvents, water, chloroform, dichloromethane, carbon tetrachloride, acetone, tetrahydrofuran, N-methyl-2-pyrrolidone, dimethylformamide, dimethylacetamide, dimethyl sulfoxide, acetonitrile, methanol, ethanol, propanol, isopropanol, butanol, hexanol, octanol, 2-methoxy-1-propanol, hexafluoroisopropanol, ethylene glycol, propylene glycol, tetramethylene glycol, tetraethylene glycol, hexamethylene glycol, diethylene glycol, and N-dimethylpyrrolidone are more preferable. These solvents may be used alone or in mixture of two or more kinds. The water is not particularly limited, but hard water, soft water, ion exchanged water, and the like are preferable. Further, in a case where the copolymer according to the present invention contains the zwitterionic monomer unit, the nanostructure can be favorably dispersed without influence from the pH of the solvent. Note that, in the present invention, a raw material of, for example, a crosslinking agent or a main component of a curable resin such as an epoxy resin can also be used as the solvent.

In the production method (i) or (v) for producing the nanocomposite in the solvent, an amount of the nanostructure added is not particularly limited, but is preferably 0.0001 parts by mass or more, more preferably 0.001 parts by mass or more, further preferably 0.005 parts by mass or more, and particularly preferably 0.01 parts by mass or more, relative to 100 parts by mass of the solvent. Meanwhile, an upper limit of the amount of the nanostructure added is not particularly limited, but is preferably 100 parts by mass or less, more preferably 80 parts by mass or less, further preferably 50 parts by mass or less, and particularly preferably 20 parts by mass or less, relative to 100 parts by mass of the solvent. If the amount of the nanostructure added is less than the lower limit, the productivity of the nanocomposite tends to be deteriorated. On the other hand, if the amount of the nanostructure added exceeds the upper limit, there are tendencies that the dispersibility of the nanostructure is deteriorated, favoring the aggregation, and that the amount of the copolymer adsorbed is likely to be reduced. Even in a case where the amount of the nanostructure added exceeds the preferable upper limit, a high quality dispersion can be obtained by, for example, collecting a portion (for example, a supernatant or the like) of the dispersion where no aggregate and precipitation occur or by other means.

In addition, the nanocomposite can be obtained by filtering, centrifugation and filtering in combination, reprecipitation, removing (for example, drying) of the solvent, melt-kneading with the solvent, sampling of the nanocomposite, or other treatment, after the copolymer is adsorbed to the nanostructure by the production method (i) or (v).

Further, in a case where the copolymer is adsorbed to the nanostructure by the production method (i) or (v), if necessary, the nanocomposite can be collected by filtering the dispersion after the mixing to remove the solvent and the unadsorbed copolymer dissolved in the solvent. The unadsorbed copolymer thus removed can be collected for recycle. Moreover, the carbon nanocomposite can be also collected by causing reprecipitation in a poor solvent for the copolymer.

<Dispersion Comprising Nanocomposite>

A dispersion of the present invention comprises the nanocomposite of the present invention and a solvent. Examples of the solvent include those exemplified in the mixing method above. In the present invention, the carbon nanocomposite prepared in the solvent can be used directly as the dispersion. Alternatively, since the carbon nanocomposite of the present invention is excellent in re-dispersibility, the dispersion can also be produced by performing ultrasonic wave treatment or the like on the carbon nanocomposite added to the solvent.

In the dispersion of the present invention, a content of the nanocomposite is not particularly limited, but is preferably 0.0001% by mass or more, more preferably 0.001% by mass or more, further preferably 0.005% by mass or more, particularly preferably 0.01% by mass or more, and most preferably 0.02% by mass or more, relative to the whole dispersion (100% by mass). Meanwhile, an upper limit of the content of the nanocomposite is not particularly limited, as long as the dispersibility of the nanocomposite can be retained. The upper limit is preferably 20% by mass or less, more preferably 18% by mass or less, further preferably 15% by mass or less, particularly preferably 13% by mass or less, and most preferably 10% by mass or less.

EXAMPLES

Hereinafter, the present invention will be described more specifically on the basis of Examples and Comparative Examples; however, the present invention is not limited to the following Examples. Note that physical properties of each copolymer and nanofiller composite were determined in accordance with the following methods.

(1) Method for Analyzing Composition of Copolymer

A copolymer was dissolved in heavy water, and subjected to a $^1$H-NMR measurement under conditions of 30° C. and 400 MHz. From the measurement result, an integration value of proton of each constitutional unit was determined according to the chemical shift listed in Table 1 below, and a molar ratio of each of the constitutional units in the copolymer was determined from the ratio of the integration values.

TABLE 1

| Repeating unit | Chemical shift | |
|---|---|---|
| 1-pyrenylbutyl methacrylate unit | proton of pyrene group | 7.5 to 8.3 ppm |
| 2-methacryloyloxyethyl phosphorylcholine unit | proton of trimethyl group | 3.1 to 3.4 ppm |
| methacryloylcholine chloride unit | proton of trimethyl group | 3.1 to 3.4 ppm |
| methoxypolyethylene glycol monomethacrylate unit | proton of ethylene in polyethylene glycol | 3.6 to 3.7 ppm |
| | proton of terminal methyl group | 3.8 to 3.9 ppm |
| methyl methacrylate unit | proton of methyl group in methyl ester group | around 3.5 ppm |
| diallyldimethylammonium chloride unit | proton of dimethyl group | 3.1 to 3.4 ppm |

(2) Method for Determining Amount of Copolymer Adsorbed

First, a nanofiller and a copolymer were each vacuum-dried, and a volatile content such as a residual solvent was removed. Then, thermogravimetric analysis (TGA) was performed by heating from room temperature to 600° C. at a rate of temperature rise of 20° C./minute in a nitrogen atmosphere using a thermogravimetric analyzer ("Thermo plus TG8120" manufactured by Rigaku Corporation). Thereby, a thermal decomposition-onset temperature and a thermal decomposition-end temperature were determined for each of the nanofiller and the copolymer. Note that, in general, a temperature at which a mass loss was started was regarded as the thermal decomposition-onset temperature, while a temperature at which the mass loss was ended was regarded as the thermal decomposition-end temperature. Nevertheless, in a case where the mass loss was not ended at 600° C., the temperature further continued to be raised until the mass loss was ended to thus determine the thermal decomposition-end temperature.

Next, a dispersion comprising the nanofiller composite obtained in each Example was subjected to suction filtration, while being washed by using ion exchanged water in an amount three times as large as the amount used for producing the dispersion. A filter cake thus obtained was vacuum-dried at 80° C. for 12 hours to thus remove the ion exchanged water. Thus, a nanofiller composite was collected. Thermogravimetric analysis was performed on the nanofiller composite by heating from room temperature to 600° C. (or to a thermal decomposition-end temperature in a case where the thermal decomposition-end temperature of the copolymer in the nanofiller composite is 600° C. or higher) at a rate of temperature rise of 20° C./minute in a nitrogen atmosphere using a thermogravimetric analyzer ("Thermo plus TG8120" manufactured by Rigaku Corporation). Part of the mass loss of the nanofiller composite attributable to the copolymer was regarded as an amount of the copolymer adsorbed to the nanofiller, which was expressed as an amount [parts by mass] relative to 100 parts by mass of the nanofiller.

(3) Dispersibility at Room Temperature

The dispersion comprising the nanofiller composite obtained in each Example was subjected to centrifugation (at a relative centrifugal acceleration of 1220 G for 1 hour) at room temperature. A UV-visible absorption spectrum of a supernatant thus obtained was measured at room temperature. The dispersibility was evaluated by the absorbance at 600 nm. The higher the value of the absorbance means that the less likely the nanofiller composite is to precipitate even when the dispersion is centrifuged, and that the more excellent dispersibility at room temperature the nanofiller composite has.

(4) Dispersibility at High Temperature

The dispersion comprising the nanofiller composite obtained in each Example was placed into an autoclave having a capacity of 50 mL and heated (160° C.) for 1 hour with a hot air dryer with the temperature kept at 160° C. The dispersion was cooled to room temperature, and then the resultant dispersion was subjected to centrifugation (at a relative centrifugal acceleration of 1220 G for 1 hour) at room temperature. A UV-visible absorption spectrum of a supernatant thus obtained was measured at room temperature. The dispersibility was evaluated by the absorbance at 600 nm. The higher the value of the absorbance means the less likely the nanofiller composite is to aggregate by high-temperature treatment, and that the more excellent dispersibility at high temperature the nanofiller composite has.

The nanofillers used in Examples and Comparative Examples are shown below. Note that a G/D value of each carbon-based nanofiller was determined as follows. Specifically, a measurement was performed by using a laser raman spectroscopy system ("NRS-3300" manufactured by JASCO Corporation) at an excitation laser wavelength of 532 nm, and the G/D value was determined on the basis of peak intensities of a G band observed at around 1585 cm$^{-1}$ and a D band observed at around 1350 cm$^{-1}$ in a raman spectrum.

Carbon-Based Nanofiller (a-1):

Single-walled carbon nanotube ("HiPco-SWNT" manufactured by CNI, average diameter: 1.0 nm, aspect ratio: more than 100, G/D value: 16.0, thermal decomposition temperature in a nitrogen atmosphere: higher than 600° C.)

Carbon-Based Nanofiller (a-2):

Multi-walled carbon nanotube ("Nanocyl 7000" manufactured by Nanocyl Inc., average diameter: 9.5 nm, aspect ratio: more than 100, G/D value: 0.7, thermal decomposition temperature in a nitrogen atmosphere: higher than 600° C.)

Furthermore, methods for preparing a copolymer used in Examples and Comparative Examples will be shown below.

Preparation Example 1

Preparation of 1-pyrenylbutyl methacrylate

In 100 ml of tetrahydrofuran, 5.0 g of 1-pyrenebutanol and 3.68 g of triethylamine were dissolved, and 1.90 g of methacryloyl chloride was added dropwise thereto at 0° C., followed by stirring at room temperature for 1 hour. A deposited material was filtered while being washed with ethyl acetate. The filtrate and the washing liquid were mixed. After the mixture was dried with magnesium sulfate, the solvent was removed by evaporation under a reduced pressure. A residue was purified by a column chromatograph (silica gel, hexane: ethyl acetate=10:1), and vacuum-dried to thus obtain 1-pyrenylbutyl methacrylate.

Preparation Example 2

Preparation of Copolymer (b-1)

In a reaction vessel equipped with a stirrer, 100 parts by mass of a mixture of 10% by mole of the 1-pyrenylbutyl methacrylate and 90% by mole of 2-methacryloyloxyethyl phosphorylcholine (MPC, manufactured by Tokyo Chemical Industry Co., Ltd.) represented by the following formula (6):

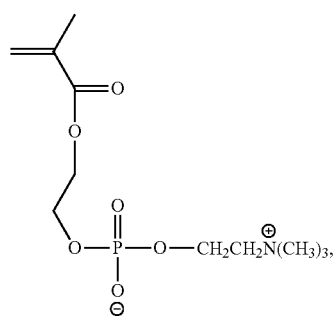

(6)

0.5 parts by mass of 2,2'-azobisisobutyronitrile, and 0.5 parts by mass of n-dodecyl mercaptan were dissolved in 750 parts by mass of chloroform to thus obtain a solution. Next, the solution was stirred under a nitrogen stream at room temperature for 15 minutes. Thereafter, the temperature was raised to 55° C. with stirring the solution at 200 rpm in a nitrogen atmosphere. With the temperature kept at 55° C. for 6 hours, the monomers were polymerized. Subsequently, the solution after polymerizing the monomers was cooled to 30° C., and then methanol was put therein to dissolve a copolymer. The solution was poured into 10 times equivalent amount of an acetone/hexane (50% by mass/50% by mass) solvent mixture, and purification was performed by reprecipitation, followed by vacuum-drying at 80° C. for 12 hours. Thus, a copolymer (b-1) was obtained.

Composition of such a copolymer (b-1) was determined in accordance with the method described in the item (1). It was confirmed that the copolymer (b-1) contained 90% by mole of MPC units and 10% by mole of 1-pyrenylbutyl methacrylate units. Thus, it was found that the copolymer (b-1) was represented by the following formula (7), and contained the zwitterionic monomer unit according to the present invention.

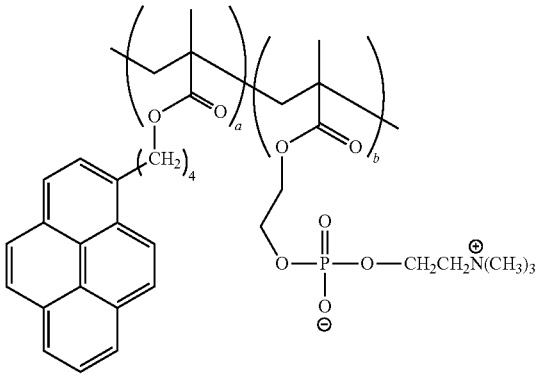

(7)

(in the formula (7), a:b=10:90 (%))

Preparation Example 3

Preparation of Copolymer (b-2)

In a reaction vessel equipped with a stirrer, 100 parts by mass of a mixture of 10% by mole of the 1-pyrenylbutyl methacrylate and 90% by mole of methacryloylcholine chloride (prepared using an aqueous solution of 80% methacryloylcholine chloride) represented by the following formula (8):

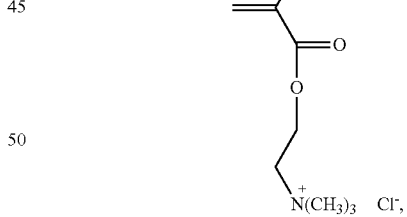

(8)

0.5 parts by mass of 2,2'-azobisisobutyronitrile, and 0.5 parts by mass of tert-dodecyl mercaptan were dissolved in 507 parts by mass of dimethylformamide to thus obtain a solution. Next, a temperature was raised to 80° C. with stirring the solution at 200 rpm under a nitrogen stream. With the temperature kept at 80° C. for 4 hours, the monomers were polymerized. Subsequently, the solution after polymerizing the monomers was cooled to 30° C. and then diluted with methanol. The solution was poured into 10 times equivalent amount of an acetone/hexane (50% by mass/50% by mass) solvent mixture, and purification was performed by reprecipitation, followed by drying to completely remove the solvent. Thus, a copolymer (b-2) was obtained.

Composition of such a copolymer (b-2) was determined in accordance with the method described in the item (1). It was confirmed that the copolymer (b-2) contained 90% by mole of methacryloylcholine chloride units and 10% by mole of 1-pyrenylbutyl methacrylate units. Thus, it was found that the copolymer (b-2) was represented by the following formula (9), and contained the cationic monomer unit according to the present invention.

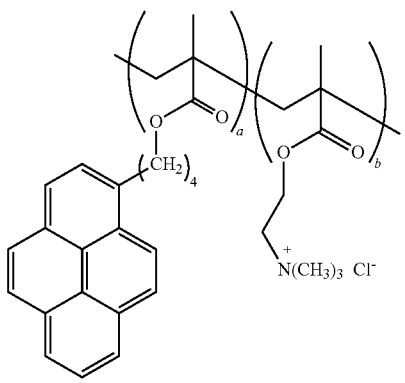

(9)

(in the formula (9), a:b=10:90 (%))

Preparation Example 4

Preparation of Copolymer (p-1)

In a reaction vessel equipped with a stirrer, 100 parts by mass of a mixture of 40% by mole of methoxypolyethylene glycol monomethacrylate ("NK ester M230G" manufactured by Shin Nakamura Chemical Co., Ltd., a radically polymerizable group is a methacryloxy group, and a polymeric chain of a polymeric chain portion is polyethylene glycol, a number average molecular weight: 1100), 25% by mole of the 1-pyrenylbutyl methacrylate, and 35% by mole of methyl methacrylate, and 1.0 parts by mass of 2,2'-azobisisobutyronitrile were dissolved in 250 parts by mass of anhydrous toluene to thus obtain a solution. Next, a temperature was raised to 75° C. with stirring the solution at 200 rpm under a nitrogen stream. With the temperature kept at 75° C. for 4 hours, the monomers were polymerized. Subsequently, the solution after polymerizing the monomers was cooled to 30° C. and then poured into 5 times equivalent amount of hexane, and purification was performed by reprecipitation, followed by drying to completely remove the solvent. Thus, a copolymer (p-1) was obtained.

Composition of such a copolymer (p-1) was determined in accordance with the method described in the item (1). It was confirmed that the copolymer (p-1) contained 55% by mole of methoxypolyethylene glycol monomethacrylate units, 16% by mole of the 1-pyrenylbutyl methacrylate units, and 29% by mole of methyl methacrylate units. Thus, it was found that the copolymer (p-1) was represented by the following formula (10):

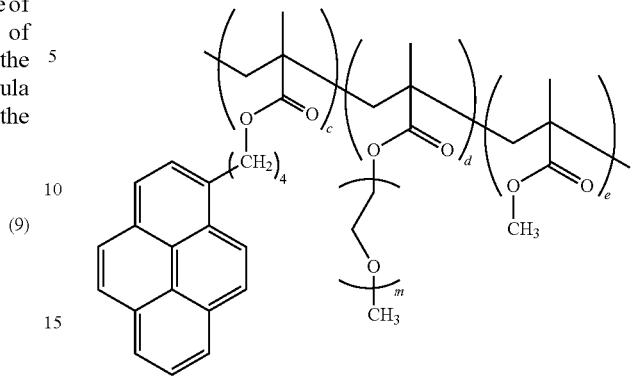

(10)

(in the formula (10), m represents the number of repeating units in the parenthesis, and c:d:e=16:55:29 (%)).

Preparation Example 5

Preparation of homopolymer (p-2)

In a reaction vessel equipped with a stirrer, 100 parts by mass of 2-methacryloyloxyethyl phosphorylcholine (MPC), 0.5 parts by mass of 2,2'-azobisisobutyronitrile, and 0.5 parts by mass of n-dodecyl mercaptan were dissolved in 750 parts by mass of chloroform to thus obtain a solution. Next, the solution was stirred under a nitrogen stream at room temperature for 15 minutes. Thereafter, the temperature was raised to 55° C. with stirring the solution at 200 rpm in a nitrogen atmosphere. With the temperature kept at 55° C. for 6 hours, the monomers were polymerized. Subsequently, the solution after polymerizing the monomers was cooled to room temperature, and then methanol was put therein to dissolve a polymer. The solution was poured into tetrahydrofuran, and purification was performed by reprecipitation, followed by vacuum-drying at 80° C. for 12 hours. Thus, a homopolymer (p-2) was obtained.

Preparation Example 6

Preparation of Copolymer (p-3)

In a reaction vessel equipped with a stirrer, 97 parts by mass of an aqueous solution of 60% by mass of diallyldimethylammonium chloride and 80 parts by mass of distilled water were charged, and a pH of the resultant solution was adjusted to 3 to 4 with hydrochloric acid. Next, to this solution, a solution in which 13.68 parts by mass of the 1-pyrenylbutyl methacrylate had been dissolved in 600 parts by mass of dimethylformamide, and 0.72 parts by mass of sodium hypophosphite were added. The mixture was stirred at 50° C. for dissolution to thus obtain a solution. Subsequently, after a temperature of the solution was raised to 60° C., 1.24 parts by mass of an aqueous solution of 28.5% by mass of ammonium persulfate was added thereto. After the temperature of the solution was kept at 60 to 65° C. for 4 hours, 2.48 parts by mass of an aqueous solution of 28.5% by mass of ammonium persulfate was further added thereto. Thereafter, the temperature was kept at 60° C. for 24 hours and then the solution was cooled to room temperature. Thus, a copolymer (p-3) was obtained.

Composition of such a copolymer (p-3) was determined in accordance with the method described in the item (1). It was confirmed that the copolymer (p-3) contained 93% by mole of diallyldimethylammonium chloride units and 7% by mole of 1-pyrenylbutyl methacrylate units. Thus, it was found that the copolymer (p-3) was represented by the following formula (11):

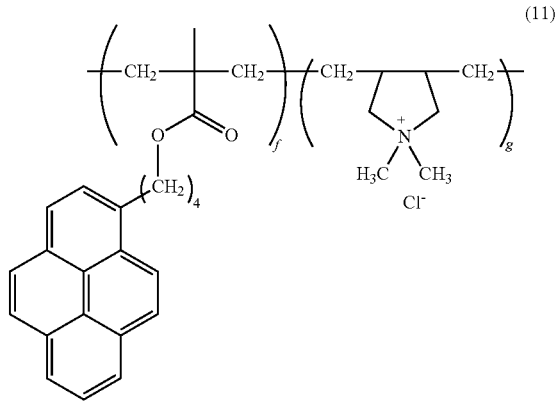

(in the formula (11), f:g=7:93 (%)).

In addition, homopolymers and compounds used in Comparative Examples in place of the copolymers according to the present invention will be shown below.

Homopolymer (p-4):
Poly(diallyldimethylammonium chloride) (manufactured by Sigma-Aldrich Corporation, aqueous solution having a solid content concentration of 20% by mass, medium molecular weight).

Homopolymer (p-5):
Poly(sodium 4-styrenesulfonate) (manufactured by Sigma-Aldrich Corporation, aqueous solution having a solid content concentration of 30% by mass, molecular weight: $20 \times 10^4$).

Compound (c-1):
2-methacryloyloxyethyl phosphorylcholine (manufactured by Tokyo Chemical Industry Co., Ltd.).

Compound (c-2):
Cetyltrimethylammonium bromide (manufactured by Tokyo Chemical Industry Co., Ltd.).

Example 1

In 25 ml of ion exchanged water, 25 mg of the copolymer (b-1) obtained in Preparation Example 2, which contained the zwitterionic monomer unit according to the present invention, was dissolved, To the solution thus obtained, 5 mg of the carbon-based nanofiller (a-1) was added, which was subjected to ultrasonic wave treatment (using a tabletop ultrasonic cleaner "BRANSONIC B-220" manufactured by BRANSON ULTRASONIC corporation, oscillating frequency: 45 kHz) for 1 hour. Thus, a dispersion was prepared. An amount of the copolymer (b-1) adsorbed to the carbon-based nanofiller (a-1) in a carbon nanocomposite dispersed in the dispersion was determined in accordance with the method described in the item (2). The amount was 34.8 parts by mass. Further, dispersibility of the carbon nanocomposite was determined in accordance with the methods described in the items (3) and (4). Table 2 shows the results.

Example 2

A dispersion was prepared in the same manner as in Example 1, except that 25 mg of the copolymer (b-2) obtained in Preparation Example 3, which contained the cationic monomer unit according to the present invention, was used in place of the copolymer (b-1). An amount of the copolymer (b-2) adsorbed to the carbon-based nanofiller (a-1) in a carbon nanocomposite dispersed in the dispersion was determined in accordance with the method described in the item (2). The amount was 36.5 parts by mass. Further, dispersibility of the carbon nanocomposite was determined in accordance with the methods described in the items (3) and (4). Table 2 shows the results.

Example 3

A dispersion was prepared in the same manner as in Example 1, except that 5 mg of the carbon-based nanofiller (a-2) was used in place of the carbon-based nanofiller (a-1). An amount of the copolymer (b-1) containing the zwitterionic monomer unit according to the present invention adsorbed to the carbon-based nanofiller (a-2) in a carbon nanocomposite dispersed in the dispersion was determined in accordance with the method described in the item (2). The amount was 33.0 parts by mass. Further, dispersibility of the carbon nanocomposite was determined in accordance with the methods described in the items (3) and (4). Table 2 shows the results.

Example 4

A dispersion was prepared in the same manner as in Example 3, except that 25 mg of the copolymer (b-2) obtained in Preparation Example 3, which contained the cationic monomer unit according to the present invention, was used in place of the copolymer (b-1). An amount of the copolymer (b-2) adsorbed to the carbon-based nanofiller (a-2) in a carbon nanocomposite dispersed in the dispersion was determined in accordance with the method described in the item (2). The amount was 32.6 parts by mass. Further, dispersibility of the carbon nanocomposite was determined in accordance with the methods described in the items (3) and (4). Table 2 shows the results.

Comparative Examples 1 to 5

Dispersions were prepared in the same manner as in Example 1, except that 25 mg of each of the copolymer (p-1) obtained in Preparation Example 4, the homopolymer (p-4), the homopolymer (p-5), the compound (c-1), and the compound (c-2) was used in place of the copolymer (b-1). Dispersibility of a carbon nanocomposite dispersed in the dispersion was determined in accordance with the methods described in the items (3) and (4). Table 2 shows the results.

Comparative Examples 6 to 9

Dispersions were prepared in the same manner as in Example 3, except that 25 mg of each of the copolymer (p-1) obtained in Preparation Example 4, the homopolymer (p-2) obtained in Preparation Example 5, the copolymer (p-3) obtained in Preparation Example 6, and the compound (c-2) was used in place of the copolymer (b-1). Dispersibility of a carbon nanocomposite dispersed in the dispersion was determined in accordance with the methods described in the items (3) and (4). Table 2 shows the results.

TABLE 2

| | Nanofiller | Polymer or the like | Dispersibility (absorbance) | |
| | | | at room temperature | at high temperature |
| --- | --- | --- | --- | --- |
| Ex. 1 | a-1 | b-1 | 5.30 | 3.03 |
| Ex. 2 | a-1 | b-2 | 5.35 | 3.67 |
| Ex. 3 | a-2 | b-1 | 1.17 | 0.78 |
| Ex. 4 | a-2 | b-2 | 1.30 | 0.93 |
| Comp. Ex. 1 | a-1 | p-1 | 5.68 | 0.30 |
| Comp. Ex. 2 | a-1 | p-4 | 1.46 | 0.03 |
| Comp. Ex. 3 | a-1 | p-5 | 1.33 | 0.01 |
| Comp. Ex. 4 | a-1 | c-1 | 1.55 | 0.03 |
| Comp. Ex. 5 | a-1 | c-2 | 3.25 | 0.04 |
| Comp. Ex. 6 | a-2 | p-1 | 1.31 | 0.19 |
| Comp. Ex. 7 | a-2 | p-2 | 0.25 | 0.02 |
| Comp. Ex. 8 | a-2 | p-3 | 0.38 | 0.03 |
| Comp. Ex. 9 | a-2 | c-2 | 0.49 | 0.09 |

As apparent from the results shown in Table 2, it was confirmed that in cases (Examples 1 to 4) where the carbon-based nanofiller composite was prepared by using the copolymer containing the polycyclic aromatic group-containing vinyl-based monomer unit and any one of the zwitterionic monomer unit and the cationic monomer unit according to the present invention, the dispersions having high dispersibility not only at room temperature but also at a high temperature of 160° C. were obtained. Particularly, it was found that in the cases (Examples 2, 4) where the copolymer containing the cationic monomer unit according to the present invention was used, the obtained dispersions had higher dispersibility at high temperature than those in the cases (Examples 1, 3) where the copolymer containing the zwitterionic monomer unit according to the present invention was used.

In contrast, in cases (Comparative Examples 1 to 9) where the copolymer according to the present invention was not used, the obtained dispersions had very low dispersibility at high temperature. Particularly, it was found that in the case (Comparative Example 7) where the polymer contained the zwitterionic monomer unit according to the present invention but was not a copolymer, and in the case (Comparative Example 8) where the copolymer contained a cationic monomer unit but not that according to the present invention, it was difficult to obtain a dispersion having high dispersibility at high temperature.

As has been described above, the present invention makes it possible to obtain a nanocomposite excellent in dispersibility in an aqueous solvent even at high temperature, and a dispersion comprising the nanocomposite. Such a nanocomposite retains the excellent dispersibility even when a hydrothermal reaction is performed at 150 to 200° C. As a result, cathode materials containing a highly-dispersed nanostructure can be produced.

Therefore, the nanocomposite of the present invention is a particularly useful material when electrical conductive properties of battery cathode materials are improved. In addition, the nanocomposite of the present invention is a useful material in cases where thermal conductive properties or electrical conductive properties of nanofluids are improved, and in other cases.

What is claimed is:

1. A nanocomposite comprising:
   a nanostructure, and
   a copolymer adsorbed to the nanostructure and containing an ionic monomer unit and a different monomer unit from the ionic monomer unit,
   wherein the ionic monomer unit is a zwitterionic monomer unit which is represented by the following formula (1):

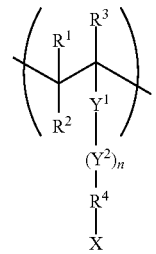

(1)

wherein in the formula (1), $R^1$, $R^2$, and $R^3$ each independently represent any one of a hydrogen atom or a monovalent organic group having 1 to 20 carbon atoms,
$Y^1$ represents any one of a carbonyl group or an arylene group,
$Y^2$ represents any one of —O— or —NH—,
n is 0 or 1,
$R^4$ represents a divalent organic group having 1 to 20 carbon atoms, and
X represents a zwitterionic group, and
wherein the different monomer unit contains at least one selected from the group consisting of a polycyclic aromatic group-containing vinyl-based monomer unit, an imide ring-containing vinyl-based monomer unit, an olefinic monomer unit, a thiophene unit, a pyrrole unit, an aniline unit, an acetylene unit, an arylene unit, an arylene ethynylene unit, and an arylene vinylene unit.

2. The nanocomposite according to claim 1, wherein the different monomer unit is the polycyclic aromatic group-containing vinyl-based monomer unit.

3. A dispersion comprising the nanocomposite according to claim 1 and a solvent.

4. A nanocomposite comprising:
   a nanostructure, and
   a copolymer adsorbed to the nanostructure and containing an ionic monomer unit and a different monomer unit from the ionic monomer unit,
   wherein the ionic monomer unit is a cationic monomer unit which is represented by the following formula (1):

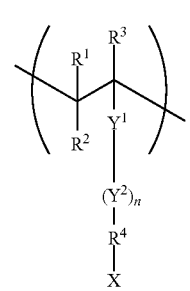

(1)

wherein in the formula (1), $R^1$, $R^2$, and $R^3$ each independently represent any one of a hydrogen atom or a monovalent organic group having 1 to 20 carbon atoms,
$Y^1$ represents any one of a carbonyl group or an arylene group,
$Y^2$ represents any one of —O— or —NH—,
n is 0 or 1,
$R^4$ represents a divalent organic group having 1 to 20 carbon atoms, and
X represents a cationic group, and wherein the different monomer unit contains at least one selected from the group consisting of a polycyclic aromatic group-containing vinyl-based monomer unit represented by the following formula (3):

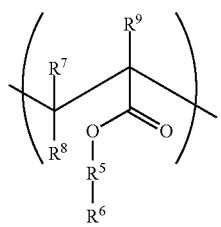

(3)

wherein in the formula (3),
$R^5$ represents a divalent organic group having 1 to 20 carbon atoms,
$R^6$ represents a monovalent polycyclic aromatic-containing group, and
$R^7$, $R^8$, and $R^9$ each independently represent any one of a hydrogen atom or a monovalent organic group having 1 to 20 carbon atoms,
an imide ring-containing vinyl-based monomer unit, a monoolefinic monomer unit, a thiophene unit, a pyrrole unit, an aniline unit, an acetylene unit, an arylene unit, an arylene ethynylene unit, and an arylene vinylene unit.

5. The nanocomposite according to claim 4, wherein the different monomer unit is the polycyclic aromatic group-containing vinyl-based monomer unit.

6. A dispersion comprising the nanocomposite according to claim 4 and a solvent.

7. A method for producing a nanocomposite, comprising:
mixing a nanostructure and a copolymer in a solvent to adsorb the copolymer to the nanostructure, the copolymer containing an ionic monomer unit and a different monomer unit from the ionic monomer unit,
wherein the ionic monomer unit is a zwitterionic monomer unit which is represented by the following formula (1):

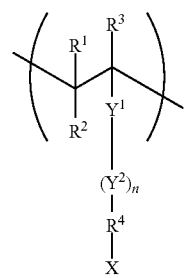

(1)

wherein in the formula (1), $R^1$, $R^2$, and $R^3$ each independently represent any one of a hydrogen atom or a monovalent organic group having 1 to 20 carbon atoms,
$Y^1$ represents any one of a carbonyl group or an arylene group,
$Y^2$ represents any one of —O— or —NH—,
n is 0 or 1,
$R^4$ represents a divalent organic group having 1 to 20 carbon atoms, and
X represents a zwitterionic group, and
wherein the different monomer unit contains at least one selected from the group consisting of a polycyclic aromatic group-containing vinyl-based monomer unit, an imide ring-containing vinyl-based monomer unit, an olefinic monomer unit, a thiophene unit, a pyrrole unit, an aniline unit, an acetylene unit, an arylene unit, an arylene ethynylene unit, and an arylene vinylene unit.

8. A method for producing a nanocomposite, comprising:
mixing a nanostructure and a copolymer in a solvent to adsorb the copolymer to the nanostructure, the copolymer containing an ionic monomer unit and a different monomer unit from the ionic monomer unit,
wherein the ionic monomer unit is a cationic monomer unit which is represented by the following formula (1):

(1)

wherein in the formula (1), $R^1$, $R^2$, and $R^3$ each independently represent any one of a hydrogen atom or a monovalent organic group having 1 to 20 carbon atoms,
$Y^1$ represents any one of a carbonyl group or an arylene group,
$Y^2$ represents any one of —O— or —NH—,
n is 0 or 1,
$R^4$ represents a divalent organic group having 1 to 20 carbon atoms, and
X represents a cationic group, and
wherein the different monomer unit contains at least one selected from the group consisting of a polycyclic aromatic group-containing vinyl-based monomer unit represented by the following formula (3):

(3)

wherein in the formula (3),
$R^5$ represents a divalent organic group having 1 to 20 carbon atoms,
$R^6$ represents a monovalent polycyclic aromatic-containing group, and
$R^7$, $R^8$, and $R^9$ each independently represent any one of a hydrogen atom or a monovalent organic group having 1 to 20 carbon atoms,
an imide ring-containing vinyl-based monomer unit, a monoolefinic monomer unit, a thiophene unit, a pyrrole unit, an aniline unit, an acetylene unit, an arylene unit, an arylene ethynylene unit, and an arylene vinylene unit.

* * * * *